US012467598B2

(12) United States Patent
Lee

(10) Patent No.: US 12,467,598 B2
(45) Date of Patent: Nov. 11, 2025

(54) LAMP AND VEHICLE INCLUDING THE SAME

(71) Applicant: HYUNDAI MOBIS CO., LTD., Seoul (KR)

(72) Inventor: Hyun Hwa Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/828,126

(22) Filed: Sep. 9, 2024

(65) Prior Publication Data

US 2025/0251103 A1 Aug. 7, 2025

(30) Foreign Application Priority Data

Feb. 1, 2024 (KR) ........................ 10-2024-0015607

(51) Int. Cl.

| | |
|---|---|
| ***F21S 41/275*** | (2018.01) |
| ***F21S 41/141*** | (2018.01) |
| ***F21S 41/32*** | (2018.01) |
| ***F21S 41/40*** | (2018.01) |
| ***F21Y 115/10*** | (2016.01) |

(52) U.S. Cl.

CPC ........... *F21S 41/275* (2018.01); *F21S 41/141* (2018.01); *F21S 41/32* (2018.01); *F21S 41/40* (2018.01); *F21Y 2115/10* (2016.08)

(58) Field of Classification Search

CPC ........................ F21S 41/14-40; F21Y 2115/10

See application file for complete search history.

(56) References Cited

U.S. PATENT DOCUMENTS

| | | | | |
|---|---|---|---|---|
| 4,930,051 A * | 5/1990 | Golz | F21S 41/28 | 362/336 |
| 8,591,083 B2 * | 11/2013 | Koizumi | F21V 5/04 | 362/520 |
| 2003/0016539 A1 * | 1/2003 | Minano | F21V 7/04 | 362/348 |
| 2022/0186898 A1 * | 6/2022 | Lee | F21S 41/27 | |

FOREIGN PATENT DOCUMENTS

| | | | |
|---|---|---|---|
| EP | 2855067 A1 * | 4/2015 | B23K 9/1087 |
| EP | 3855067 A1 * | 7/2021 | F21S 41/285 |

* cited by examiner

*Primary Examiner* — Jason M Han

(74) *Attorney, Agent, or Firm* — NSIP Law

(57) ABSTRACT

A lamp and a vehicle therefor are provided. The lamp includes: a light source to output light; and a lens disposed on a front side of the light source. The lens includes an input surface to which the light is input, the input surface defining a rear side of the lens. The input surface includes: a concave surface having a shape being recessed forward to be concave when an upper side of the input surface is viewed in parallel to an upward/downward direction; and a convex surface having a shape protruding to be convex rearward when the upper side of the input surface is viewed in parallel to the upward/downward direction, the convex surface connected to the concave surface in a first direction crossing a forward/rearward direction and the upward/downward direction.

8 Claims, 4 Drawing Sheets

LAMP AND VEHICLE INCLUDING THE SAME

CROSS-REFERENCE TO RELATED APPLICATION(S)

This application claims the benefit of priority under 35 USC § 119 to Korean Patent Application No. 10-2024-0015607, filed in the Korean Intellectual Property Office on Feb. 1, 2024, the entire contents of which are incorporated herein by reference for all purposes.

BACKGROUND

1. Field

The present disclosure relates to a lamp and a vehicle including the same.

2. Description of the Related Art

Generally, lamps provided in vehicles are designed to form a beam pattern. A beam pattern refers to a pattern that is formed by light irradiated from a lamp, and the beam pattern is required to satisfy regulations. Recently, there has been active development of lamps that may form a beam pattern that is optimized to ensure visibility of the driver while satisfying laws and regulations.

The lamps are largely classified into headlamps that are provided on a front side of a vehicle and rear lamps that are provided on a rear side of the vehicle. Among them, the headlamp may determine the visibility of the driver for a front side and an aesthetic texture of the vehicle, which is viewed from an outside. To maximize the aesthetic texture of the vehicles, all areas of an output surface of the lamp have to emit light evenly.

Meanwhile, a dark part, through which light does not pass, is formed on an output surface of a conventional lamp. In this way, when a dark part is formed on the output surface, a discontinuous texture is formed in an image of the lamp seen from and outside, and thus, an aesthetic texture of the vehicle deteriorates.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure has been made to solve the above-mentioned problems occurring in the prior art while advantages achieved by the prior art are maintained intact.

An aspect of the present disclosure provides a lamp that maximizes an aesthetic texture of a vehicle by preventing a discontinuous texture from occurring in an image of the lamp seen from an outside.

The technical problems to be solved by the present disclosure are not limited to the aforementioned problems, and any other technical problems not mentioned herein will be clearly understood from the following description by those skilled in the art to which the present disclosure pertains.

In a general aspect of the disclosure, a lamp includes: a light source configured to output light; and a lens disposed on a front side of the light source, wherein the lens includes an input surface to which the light is input, the input surface defining a rear side of the lens, and wherein the input surface includes: a concave surface having a shape being recessed forward to be concave when an upper side of the input surface is viewed in parallel to an upward/downward direction; and a convex surface having a shape protruding to be convex rearward when the upper side of the input surface is viewed in parallel to the upward/downward direction, the convex surface connected to the concave surface in a first direction crossing a forward/rearward direction and the upward/downward direction.

A width of the concave surface in the first direction may be smaller than a width of the convex surface in the first direction.

A radius of curvature of a horizontal cross-section of the concave surface may be smaller than a radius of curvature of a horizontal cross-section of the convex surface.

The input surfaces may include a plurality of concave surfaces and a plurality of convex surfaces, and the plurality of concave surfaces and the plurality of convex surfaces may be alternately arranged along the first direction.

The first direction may be defined as a direction being perpendicular to the upward/downward direction, and crossing the forward/rearward direction and a leftward/rightward direction.

The plurality of concave surfaces may include a first concave surface, the plurality of convex surfaces may include a first convex surface and a second convex surface that are spaced apart from each other in the first direction, with the first concave surface being interposed therebetween, the first convex surface may be disposed on a front side of the second convex surface, and the first convex surface may be disposed between the first concave surface and the second convex surface with respect to the forward/rearward direction.

The lens may further include an output surface from which the light is output, the output surface defining a front side of the lens, wherein the output surface may extend in the first direction, wherein a convexo-concave area may include: a plurality of bosses having a shape protruding in a direction facing an outside of the lens; and a plurality of grooves recessed in a direction facing an inside of the lens being formed on a surface of the output surface, and wherein the plurality of bosses and the plurality of grooves may be alternately arranged along the first direction.

The lens may further include: a lens body, through which the light having reached the input surface passes, the lens body disposed on a front side of the input surface; and an output surface, from which the light having passed through the lens body is output, the output surface disposed on a front side of the lens body, and the input surface may be integrally formed with the lens body and the output surface.

In another general aspect of the disclosure. a vehicle includes: a vehicle body; and a lamp mounted on the vehicle body, wherein the lamp includes: a light source configured to output light; and a lens disposed on a front side of the light source, wherein the lens includes an input surface, to which the light is input, the input surface defining a rear side of the lens, and wherein the input surface includes: a concave surface having a shape being recessed forward to be concave when an upper side of the input surface is viewed in parallel to an upward/downward direction; and a convex surface having a shape protruding to be convex rearward when the upper side of the input surface is viewed in parallel to the upward/downward direction, and connected to the concave surface in a first direction crossing a forward/rearward direction and the upward/downward direction.

In yet another general aspect of the disclosure, a lamp for a vehicle, includes: a plurality of light sources configured to output light; and a lens disposed on a front side of the plurality of light sources and including: an input surface defining a rear side of the lens, the input surface configured to receive the light from the plurality of light sources; and an output surface defining a front side of the lens, the output surface configured to emit the light received by the input surface, wherein the input surface includes: a concave surface configured to receive the light from a first light source, among the plurality of light sources; and a convex surface configured to receive the light from a second light source, among the plurality of light sources.

The output surface of the lens may include a plurality of bosses that form step surfaces.

The plurality of bosses may include: a first set of bosses that receive the light emitted through the concave surface of the lens and emit light therethrough; and a second set of bosses that receive the light emitted through the convex surface of the lens and emit light therethrough.

The light emitted through the concave surface of the lens may provide a wide zone pattern.

The light emitted through the convex surface of the lens may provide a hot zone pattern.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
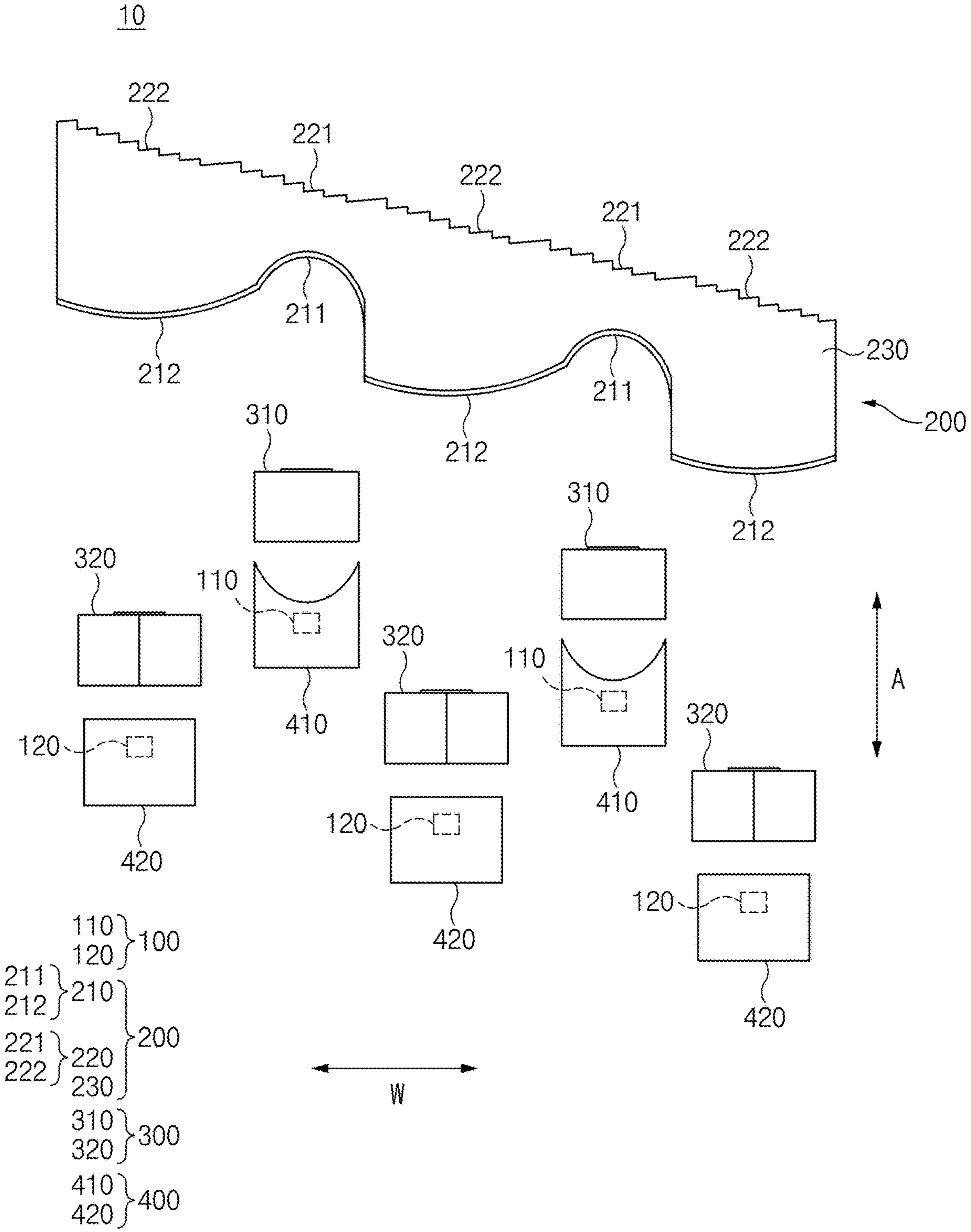
FIG. 1 is a plan view of a lamp according to an embodiment of the present disclosure.

Hereinafter, embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the embodiments of the present disclosure, when it is determined that a detailed description of related known configurations and functions may hinder understanding of the embodiments of the present disclosure, a detailed description thereof will be omitted.

Hereinafter, a lamp 10 and the vehicle including the same according to the present disclosure will be described with reference to the drawings.

FIG. 1 is a plan view of a lamp according to an embodiment of the present disclosure.

Referring to FIG. 1, a vehicle may include a vehicle body and the lamp 10. The vehicle body may define an external appearance of a vehicle. The lamp 10 may be a headlamp for ensuring visibility on a front side of the driver. Furthermore, a plurality of lamps 10 are provided, and the plurality of lamps 10 may be provided on a front left and a front right sides of the vehicle, respectively. The lamp 10 may include a light source 100, a lens 200, a shield part 300, and a reflective part 400.

The light source 100 may output light. For example, this light source 100 may be provided as a light emitting diode (LED). A plurality of light sources 100 may be provided. The plurality of light sources 100 may be spaced apart from each other in a leftward/rightward direction "W". The plurality of light sources 100 may include a first light source 110 and a second light source 120.

The light output from the first light source 110 may pass through the lens 200 to form a wide zone of a beam pattern. For example, the light output from the first light source 110 may sequentially pass through a first reflector 410, a first shield 310, a concave surface 211, and a first boss 221, which will be described later. Among the light output from the first light source 110, the light that has passed through the first boss 221 may form the wide zone of the beam pattern.

The light that is output from the second light source 120 may pass through the lens 200 to form a hot zone of the beam pattern. For example, the light output from the second light source 120 may sequentially pass through a second reflector 420, a second shield 320, a convex surface 212, and a second boss 222, which will be described later. Among the light output from the second light source 120, the light that has passed through the second boss 222 may form a hot zone of the beam pattern.

A plurality of first light sources 110 and a plurality of second light sources 120 may be provided. For example, the plurality of first light sources 110 and the plurality of second light sources 120 may be alternately disposed along the leftward/rightward direction "W".

Figure 2:
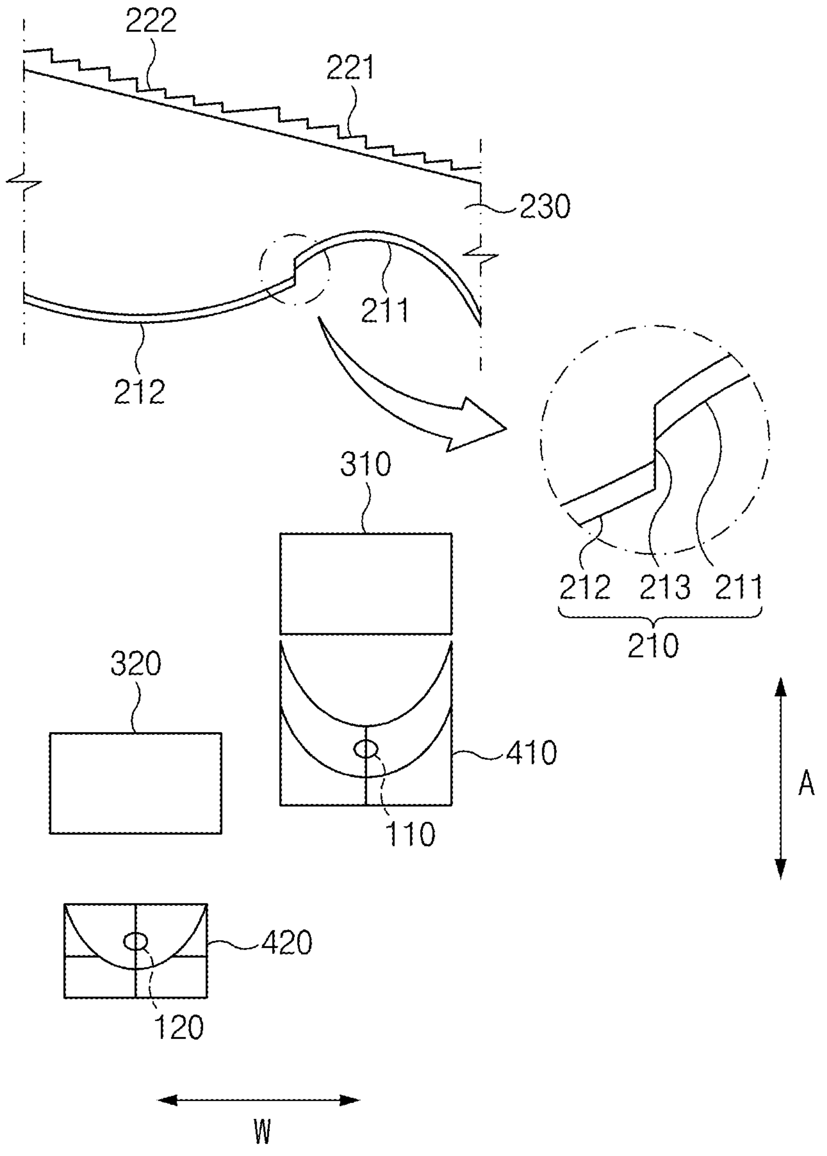
FIG. 2 is a plan view illustrating a portion of a lamp according to an embodiment of the present disclosure.
Figure 3:
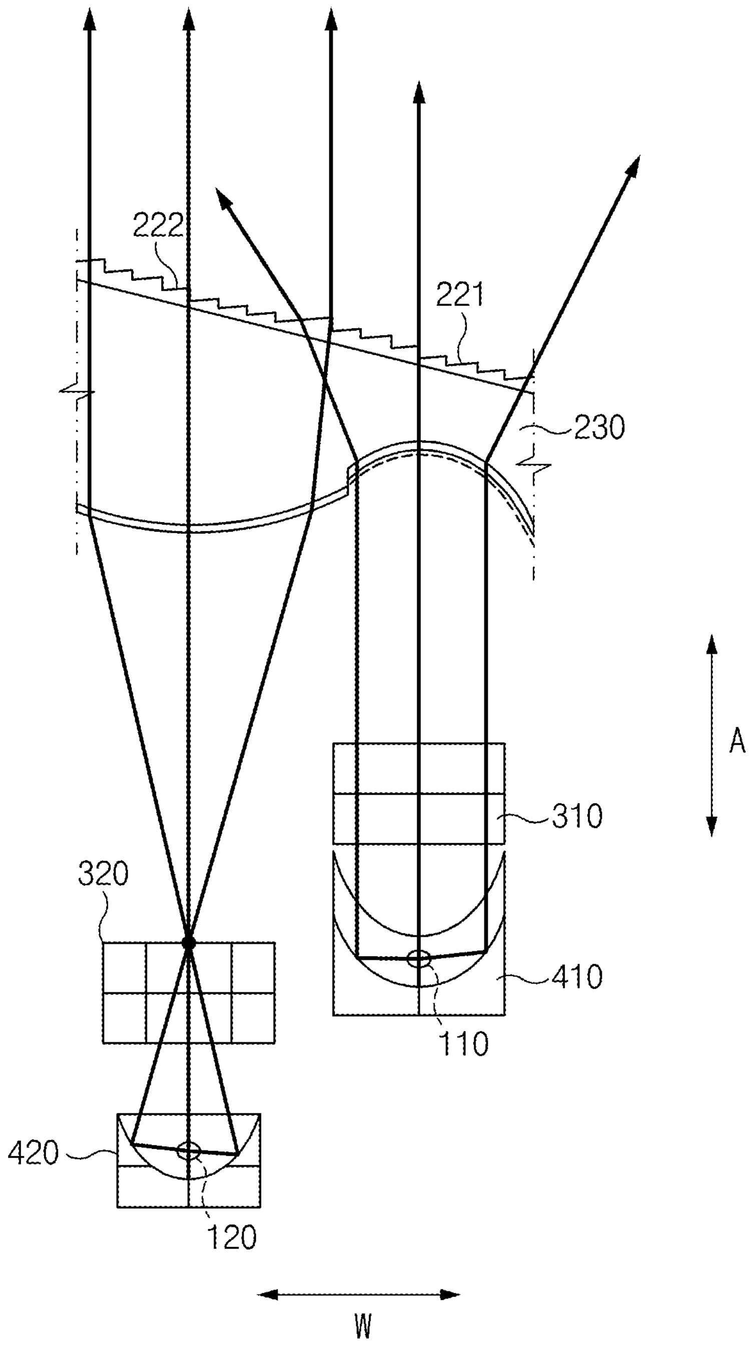
FIG. 3 is a view illustrating a path of light that is output from a first light source and a second light source according to an embodiment of the present disclosure.

FIG. 2 is a plan view illustrating a part of a lamp according to an embodiment of the present disclosure, and FIG. 3 is a view illustrating a path of the light output from the first light source and the second light source according to an embodiment of the present disclosure.

Referring further to FIGS. 2 and 3, in the lens 200, the light output from the plurality of light sources 100 may be input, pass, and then be output. As an example, the light output from the lens 200 may form a beam pattern. The lens 200 may include an input surface 210, an output surface 220, and a lens body 230.

The input surface 210 may refer to an area of the lens 200, in which the light output from the light source 100 is input. The input surface 210 may define a rear side of the lens 200. The input surface 210 may include a concave surface 211 and a convex surface 212.

The concave surface 211 may have a shape that is concave forward when an upper side of the input surface 210 is viewed in parallel to an upward/downward direction. The light output from the first light source 110 may be input to the concave surface 211. For example, the light that has passed through the first shield 310 may be input to the concave surface 211.

When the upper side of the input surface 210 is viewed in parallel to the upward/downward direction, the light input to the concave surface 211 may be refracted to spread in the leftward/rightward direction "W". For example, a width in the leftward/rightward direction "W" of a light bundle that has reached the concave surface 211 may be smaller than a width in the leftward/rightward direction "W" of a light bundle that is refracted on the concave surface 211 and output from the output surface 220.

A plurality of concave surfaces 211 may be provided. The plurality of concave surfaces 211 may be spaced apart from each other along a first direction. The first direction may be defined as a direction that crosses a forward/rearward direction "A" and the upward/downward direction. In detail, the first direction may be defined as a direction that is perpendicular to the upward/downward direction and crosses the forward/rearward direction "A" and the leftward/rightward direction "W". Furthermore, when an imaginary straight line that extends in the first direction is referred to as a first straight line, an inclination of the first straight line in the forward/rearward direction "A" with respect to the leftward/rightward direction "W" may be smaller than 1. For example, when an imaginary straight line that extends in the leftward/rightward direction "W" is referred as a leftward/rightward reference line and an imaginary straight line that extends in the forward/rearward direction "A" is referred to as a forward/rearward reference line, an acute angle that is defined by the first straight line and the leftward/rightward straight line may be smaller than an acute angle that is defined by the first straight line and the forward/rearward reference line. However, the idea of the present disclosure is not limited thereto, and the acute angle defined by the first straight line and the leftward/rightward reference line may be smaller than the acute angle defined by the first straight line and the forward/rearward reference line.

The convex surface 212 may have a shape that protrudes to be convex rearward when the upper side of the input surface 210 is viewed in parallel to the upward/downward direction. The light output from the second light source 120 may be input to the convex surface 212. For example, that light that has passed through the second shield 320 may be input to the convex surface 212.

Referring back to FIG. 3, when the upper side of the input surface 210 is viewed in parallel to the upward/downward direction, the light output from the convex surface 212 may be refracted so that the light bundle becomes parallel. The meaning of the light bundle being parallel may be understood as a concept including not only when the plurality of light rays constituting the light bundle are all parallel to each other, but also when any two light rays, among the plurality of light rays, form an angle that is so fine that it is almost the same as when they are parallel to each other.

Furthermore, a first ray that is a ray located on an opposite side of the first direction, among the lights output to the concave surface 211, and a second ray that is a ray located on one side of the first direction, among the lights output to the convex surface 212, may cross each other in the lens body 230. For example, based on when the concave surface 211 is located relatively on the right side and the convex surface 212 is located relatively on the left side, the first ray may refer to one of the lights output to the concave surface 211, which is located on the leftmost side, and the second ray may refer to one of the lights, which is located on the rightmost side. As a detailed example, a first point that is a point, at which the first ray and the output surface 220 cross each other, may be located on a left side of a second point that is a point, at which the second ray crosses the output surface 220. In other words, the light bundle that has passed through the concave surface 211 may be output in an area of the output surface 220, which is formed between the first point and the second point.

That is, as the light passing through the concave surface 211 spreads in the leftward/rightward direction "W" due to the optical characteristics through the shape of the concave surface 211, light is also emitted in the area of the output surface 220, which is formed between the first point and the second point. There is an advantage that light can be output uniformly from all areas of the output surface 220.

A plurality of convex surfaces 212 may be provided. The plurality of convex surfaces 212 may be spaced apart from each other along a first direction. For example, the plurality of concave surfaces 211 and the plurality of convex surfaces 212 may be alternately disposed along the first direction. The plurality of convex surfaces 212 may include a first convex surface and a second convex surface.

The first convex surface and the second convex surface may mean two convex surfaces that are spaced apart from each other in the first direction with the first concave surface (any one concave surface, among the plurality of concave surfaces 211) being interposed therebetween, among the plurality of convex surfaces 212.

The first convex surface may be disposed on a front side of the second convex surface. The first convex surface may be disposed between the first concave surface and the second convex surface with respect to the forward/rearward direction "A". For example, the first concave surface may be disposed on a front (rear) side of the first convex surface, and the second convex surface may be disposed on a rear (front) side of the first convex surface. In other words, the first convex surface, the first concave surface, and the second convex surface may be sequentially arranged along the forward/rearward direction "A".

Furthermore, a first width that is a width of the concave surface 211 in the first direction, and a second width that is a width of the convex surface 212 in the first direction may be different. For example, the first width of the concave surface 211 may be smaller than the second width of the convex surface 212. However, there present disclosure is not limited by the example, and the first width of the concave surface 211 may be greater than the second width of the convex surface 212.

Furthermore, a first radius of curvature that is a radius of curvature of a horizontal cross-section of the concave surface 211, and a second radius of curvature that is a radius of curvature of a horizontal cross-section of the convex surface 212 may be different. For example, the first radius of curvature may be smaller than the second radius of curvature. In other words, a curving degree of the concave surface 211 may be greater than a curving degree of the convex surface 212. However, the idea of the present disclosure is not limited thereto, and the first radius of curvature may be greater than the second radius of curvature. In other words, the curving degree of the concave surface 211 may be smaller than the curving degree of the convex surface 212.

In this way, because the first radius of curvature of the concave surface 211 is formed to be greater than the second radius of curvature of the convex surface 212, a sufficient spreading angle of the light that has passed through the concave surface 211 may be ensured even though the first width of the concave surface 211 is formed to be smaller than the second width of the convex surface 212.

Furthermore, the input surface 210 may further include a connection surface 213. Referring back to FIG. 2, the connection surface 213 may connect one end of the concave surface 211 in the first direction and an opposite end of the convex surface 212 in the first direction. The connection surface 213 may extend in the forward/rearward direction "A". For example, a front end of the connection surface 213 may be connected to the concave surface 211, and a rear end of the connection surface 213 may be connected to the convex surface 212. In other words, one end of the concave surface 211 in the first direction and an opposite end of the convex surface 212 in the first direction may be spaced apart from each other in the forward/rearward direction "A" by the connection surface 213. The connection surface 213 may be formed integrally with the concave surface 211 and the convex surface 212.

The output surface 220 may refer to an area of the lens 200, in which the light that has passed through the lens body 230 is output. The output surface 220 may define a front side of the lens 200. A convexo-concave area 221 and 222 may be formed on a surface of the output surface 220.

The convexo-concave area 221 and 222 may include a plurality of bosses and a plurality of grooves. The plurality of bosses may have a shape that protrudes in a direction that faces an outside of the lens 200. For example, when the upper side of the lens 200 is viewed in parallel to the upward/downward direction, the bosses may have a rectangular or semicircular shape. However, the shape of the bosses is not limited to the example, and may be provided in various shapes that protrude from the output surface 220.

Furthermore, each of the plurality of grooves may have a shape that protrudes in a direction that faces an inside of the lens 200. For example, the grooves may be formed between two adjacent ones of the plurality of bosses. In other words, the shape of the grooves may be determined by the shape of the bosses.

Furthermore, the plurality of bosses may include a first boss 221 and a second boss 222. The first boss 221 may be formed in a first output area that is an area of the output surface 220, which faces the concave surface 211 in the forward/rearward direction "A". In other words, when the front side of the lens 200 is viewed parallel to the forward/rearward direction "A", the first output area may mean an area of the output surface 220, which overlaps the concave surface 211.

A plurality of first bosses 221 may be provided. The plurality of grooves formed by the plurality of first bosses 221 may be named a plurality of first grooves. The plurality of first bosses 221 and the plurality of first grooves may be alternately disposed along the first direction on a surface of the first output area.

The second boss 222 may be formed in a second output area that is an area of the output surface 220, which faces the convex surface 212 in the forward/rearward direction "A". In other words, when the front side of the lens 200 is viewed in parallel to the forward/rearward directions, the second output area may mean an area of the output surface 220, which overlaps the convex surface 212.

A plurality of second bosses 222 may be provided. The plurality of grooves formed by the plurality of second bosses 222 may be named a plurality of second grooves. The plurality of second bosses 222 and the plurality of second grooves may be alternately disposed along the first direction on a surface of the second output area.

The light that has reached the input surface 210 may pass through the lens body 230. The lens body 230 may be disposed on a front side of the input surface 210. Furthermore, the output surface 220 may be disposed on a rear side of the lens body 230. In other words, the front side of the lens body 230 may be connected to the input surface 210, and the rear side of the lens body 230 may be connected to the output surface 220. Furthermore, as an example, the plurality of input surfaces 210, the plurality of output surfaces 220, and the lens body 230 may be integrally formed.

The shield part 300 may shield a portion of the light output from the light source 100 from being input to the lens 200. The shield part 300 may be disposed between the light source 100 and the lens 200 with respect to the forward/rearward direction "A".

The shield part 300 may include a plurality of shields. The plurality of shields may include a first shield 310 and a second shield 320.

The first shield 310 may shield a portion of the light output from the first light source 110 from being input into the concave surface 211. The second shield 320 may shield a portion of the light output from the second light source 120 from being input to the convex surface 212.

A plurality of first shields 310 and a plurality of second shields 320 may be provided. For example, the plurality of first shields 310 and the plurality of second shields 320 may be alternately disposed along the leftward/rightward direction "W".

The reflective part 400 may reflect (e.g., total reflection) the light output from the light source 100. The reflective part 400 may include a plurality of reflectors. The plurality of reflectors may include a first reflector 410 and a second reflector 420.

The first reflector 410 may reflect (e.g., total reflection) the light output from the first light source 110. As an example, the light reflected from the first reflector 410 may travel toward a front end of the first shield 310.

Referring again to FIG. 3, when the upper side of the lamp 10 is viewed in parallel to the upward/downward direction, the light output from the first light source 110 and reflected by the first reflector 410 may travel in parallel to the forward/rearward direction "A". In other words, a horizontal focus of the first reflector 410 may not exist.

The second reflector 420 may reflect (e.g., total reflection) the light output from the second light source 120. As an example, the light reflected from the second reflector 420 may travel toward a front end of the second shield 320.

Referring again to FIG. 3, when the upper side of the lamp 10 is viewed in parallel to the upward/downward direction, the light emitted from the second light source 120 and reflected by the second reflector 420 may be input to the convex surface 212 after being condensed in an area between the convex surface 212 and the second reflector 420. In other words, a horizontal focus of the second reflector 420 may be located between the convex surface 212 and the second reflector 420 with respect to the forward/rearward direction "A". For example, a horizontal focus of the second reflector 420 may be located at a front end of the second shield 320 with respect to the forward/rearward direction "A".

A plurality of first reflectors 410 and a plurality of second reflectors 420 may be provided. For example, the plurality of first reflectors 410 and the plurality of second reflectors 320 may be alternately disposed along the leftward/rightward direction "W".

Furthermore, when an imaginary straight line that passes through the first light source 110 and extends in the forward/rearward direction "A" is referred to as a first reference line, the first reference line may be configured to pass through the first light source 110, the first reflector 410, the first shield 310, the concave surface 211, and the first output area when the upper side of the lamp 10 is viewed in parallel with the upward/downward direction. For example, the light output from the first light source 110 may form a wide zone after sequentially passing through the first reflector 410, the first shield 310, the concave surface 211, and the first output area. That is, one first light source 110, one first reflector 410, one first shield 310, one concave surface 211, and one first output area, through which one second reference line passes, and which correspond to each other one to one may be named 'a first optical module'.

Furthermore, a plurality of first light sources 110, a plurality of first reflectors 410, a plurality of first shields 310, a plurality of concave surfaces 211, and a plurality of first output areas may correspond to each other one to one. Furthermore, when, among the plurality of concave surfaces 211, the concave surface 211 located relatively on a front side is referred to as a front concave surface, and the concave surface 211 located relatively on a rear side is referred to as the rear concave surface, the first light source 110, the first reflector 410, the first shield 310, and the first output area corresponding to the front concave surfaces one to one may be located on a front side of the first light source 110, the first reflector 410, the first shield 310, and the first output area corresponding to the rear concave surfaces one to one. In other words, the plurality of first optical modules may have the same shape, but may be disposed to be spaced apart from each other in the forward/rearward direction "A" and the first direction.

Furthermore, when an imaginary straight line that passes through the second light source 120 and extends in the forward/rearward direction "A" is referred to as a second reference line, the second reference line may be configured to pass through the second light source 120, the second reflector 420, the second shield 320, the convex surface 212, and the second output area when the upper side of the lamp 10 is viewed in parallel with the upward/downward direction. For example, the light output from the second light source 120 may form a hot zone after sequentially passing through the second reflector 420, the second shield 320, the convex surface 212, and the second output area. That is, one second light source 120, one second reflector 420, one second shield 320, one convex surface 212, and one second output area, through which one second reference line passes, and which correspond to each other one to one may be named 'a second optical module'.

Furthermore, a plurality of second light sources 120, a plurality of second reflectors 420, a plurality of second shields 320, a plurality of convex surfaces 212, and a plurality of second output areas may correspond to each other one to one. Furthermore, when, among the plurality of convex surfaces 212, the convex surface 212 located relatively on a front side is referred to as a front convex surface, and the convex surface 212 located relatively on a rear side is referred to as the rear convex surface, the second light source 120, the second reflector 420, the second shield 320, and the second output area corresponding to the front convex surfaces one to one may be located on a front side of the second light source 120, the second reflector 420, the second shield 320, and the second output area corresponding to the rear convex surfaces one to one. In other words, the plurality of second optical modules may have the same shape, but may be disposed to be spaced apart from each other in the forward/rearward direction "A" and the first direction. Furthermore, the first light source 110, the first reflector 410, and the first shield 310 corresponding to the above-described first concave surfaces one-to-one may be located on a front (rear) side of the second light source 120, the second reflector 420, and the second shield 320 corresponding to the convex surfaces (as an example, the first convex surface and the second convex surface described above) that are adjacent to the first concave surface one to one.

Hereinafter, a comparison will be made between a conventional beam pattern BP and a beam pattern AP according to an embodiment of the present disclosure, with further reference to FIG. 4.

Figure 4:
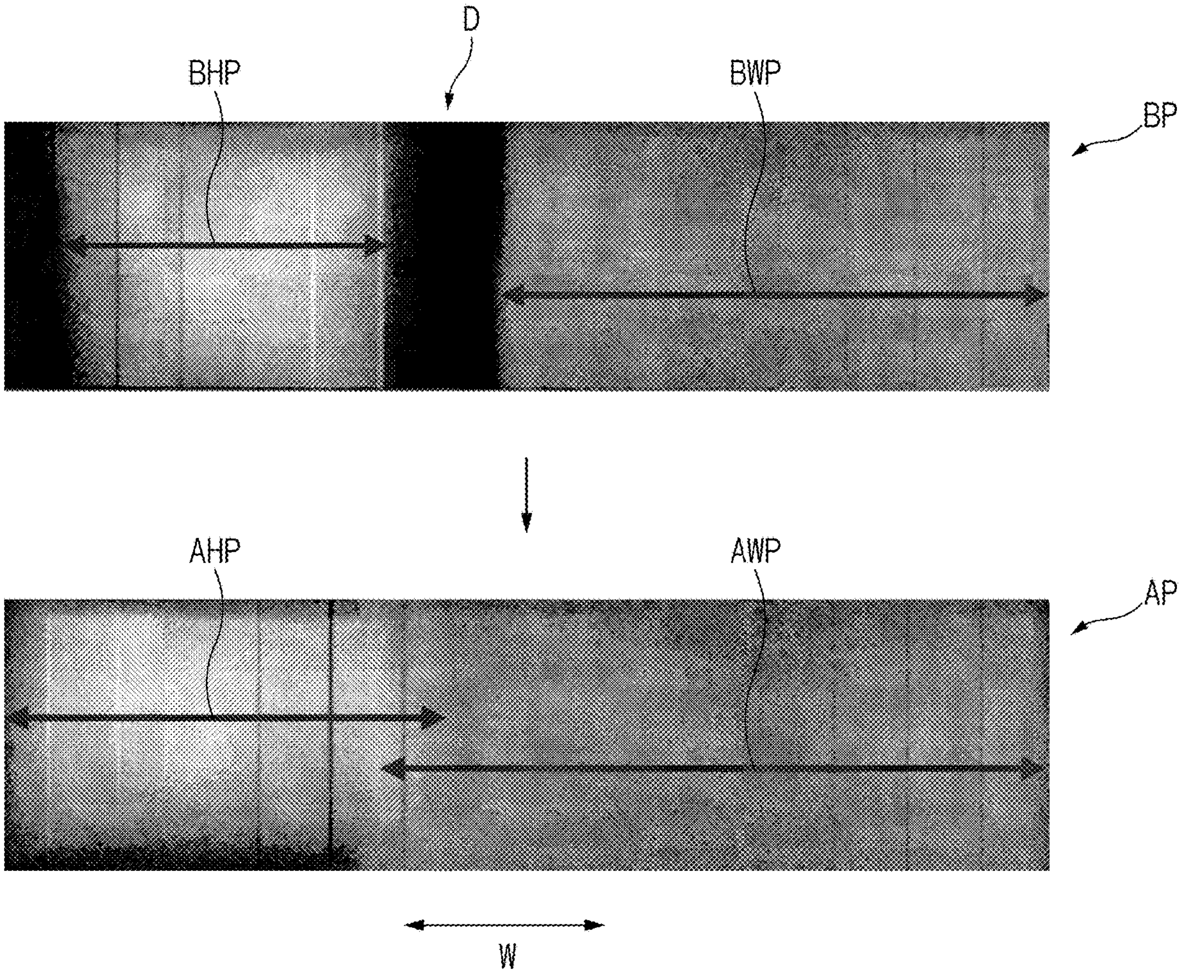
FIG. 4 is a view illustrating a beam pattern that is formed by a conventional lamp and a beam pattern that is formed by a lamp according to an embodiment of the present disclosure.

FIG. 4 is a view illustrating a beam pattern that is formed by a conventional lamp and a beam pattern that is formed by a lamp according to an embodiment of the present disclosure.

Referring to FIG. 4, in the conventional beam pattern BP, there has been a dark part "D", in which light distribution is not formed, between a wide zone BWP and a hot zone BHP. On the other hand, in the beam pattern AP according to an embodiment of the present disclosure, a wide zone AWP and a hot zone AHP partially overlap each other, so that there is no dark part between the wide zone AWP and the hot zone AHP.

For example, the wide zone AWP according to an embodiment of the present disclosure is any part of a beam pattern that is formed by the light output from the first output area, and the hot zone may be another part of the beam pattern that is formed by the light output from the second output area. Furthermore, through a positional relationship between the first and second light rays set according to the shape of the concave surface 211 described above, there may be no dark part between the wide zone AWP and the hot zone AHP formed by the lamp 10 according to an embodiment of the present disclosure.

Accordingly, while the conventional beam pattern BP has a pattern shape discontinued by the dark part "D", the beam pattern AP according to an embodiment of the present disclosure may have a uniform pattern shape with no discontinuous texture.

The lamp maximizes an aesthetic texture of a vehicle by preventing a discontinuous texture from occurring in an image of the lamp seen from an outside.

In the above description, just because all the components constituting the embodiment of the present disclosure are described as being combined or operating in combination, the present disclosure is not necessarily limited to this embodiment. That is, within the scope of the purpose of the present disclosure, all of the components may operate in selective combination of one or more. In addition, terms such as "include," "comprise," or "have" described above mean that the corresponding component may be present, and thus do not exclude other components unless specifically stated to the contrary, and rather, it should be interpreted as being able to include other components. Unless defined differently, all the terms including technical or scientific terms have the same meanings as those generally understood by an ordinary person in the art, to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

The above description is a simple exemplary description of the technical spirits of the present disclosure, and an ordinary person in the art, to which the present disclosure pertains, may make various corrections and modifications without departing from the essential characteristics of the present disclosure. Therefore, the embodiments disclosed in the present disclosure are not for limiting the technical spirits of the present disclosure but for describing them, and the scope of the technical spirits of the present disclosure is not limited by the embodiments. The protection scope of the present disclosure should be construed by the following claims, and all the technical spirits in the equivalent range should be construed as being included in the scope of the present disclosure.

What is claimed is:

1. A lamp comprising:

a light source configured to emit light; and a lens disposed on a front side of the light source, wherein the lens comprises:

an input surface configured to receive the light emitted from the light source and defining a rear side of the lens, the input surface including:

a concave surface recessed forward to be concave when an upper side of the input surface is viewed in parallel to an upward/downward direction; and a convex surface protruding rearward to be convex when the upper side of the input surface is viewed in parallel to the upward/downward direction, the convex surface being connected to the concave surface in a first direction that crosses a forward/rearward direction and the upward/downward direction, and an output surface disposed on a front side of the lens and configured to emit the light, and wherein the output surface extends in the first direction and includes:

a plurality of protruding regions extending outward from the lens; and a plurality of grooves recessed inward into the lens, wherein the input surfaces include a plurality of concave surfaces and a plurality of convex surfaces, wherein the plurality of concave surfaces and the plurality of convex surfaces are alternately arranged along the first direction, wherein the first direction is defined as a direction being perpendicular to the upward/downward direction, and crossing the forward/rearward direction and a leftward/rightward direction, wherein the plurality of concave surfaces include a first concave surface, wherein the plurality of convex surfaces include a first convex surface and a second convex surface that are spaced apart from each other in the first direction, with the first concave surface being interposed therebetween, wherein the first convex surface is disposed on a front side of the second convex surface, and wherein the first convex surface is disposed between the first concave surface and the second convex surface with respect to the forward/rearward direction.

2. The lamp of claim 1, wherein a width of the concave surface in the first direction is smaller than a width of the convex surface in the first direction.

3. The lamp of claim 1, wherein a radius of curvature of a horizontal cross-section of the concave surface is smaller than a radius of curvature of a horizontal cross-section of the convex surface.

4. The lamp of claim 1, wherein the output surface defines a front side of the lens, and wherein the plurality of protruding regions and the plurality of grooves are alternately arranged along the first direction.

5. The lamp of claim 1, wherein the lens further includes:

a lens body, through which the light having reached the input surface passes, the lens body disposed on a front side of the input surface; and the output surface, from which the light having passed through the lens body is output, the output surface disposed on a front side of the lens body, and wherein the input surface is integrally formed with the lens body and the output surface.

6. A vehicle comprising:

a vehicle body; and a lamp mounted on the vehicle body, wherein the lamp comprises:

a light source configured to emit light; and a lens disposed on a front side of the light source, wherein the lens comprises:

an input surface configured to receive the light emitted from the light source and defining a rear side of the lens, the input surface including:

a concave surface recessed forward to be concave when an upper side of the input surface is viewed in parallel to an upward/downward direction; and a convex surface protruding rearward to be convex when the upper side of the input surface is viewed in parallel to the upward/downward direction, the convex surface being connected to the concave surface in a first direction that crosses a forward/rearward direction and the upward/downward direction, and an output surface disposed on a front side of the lens and configured to emit the light, and wherein the output surface extends in the first direction and includes:

a plurality of protruding regions extending outward from the lens; and a plurality of grooves recessed inward into the lens, wherein the input surfaces include a plurality of concave surfaces and a plurality of convex surfaces, wherein the plurality of concave surfaces and the plurality of convex surfaces are alternately arranged along the first direction, wherein the first direction is defined as a direction being perpendicular to the upward/downward direction, and crossing the forward/rearward direction and a leftward/rightward direction, wherein the plurality of concave surfaces include a first concave surface, wherein the plurality of convex surfaces include a first convex surface and a second convex surface that are spaced apart from each other in the first direction, with the first concave surface being interposed therebetween, wherein the first convex surface is disposed on a front side of the second convex surface, and wherein the first convex surface is disposed between the first concave surface and the second convex surface with respect to the forward/rearward direction.

7. A lamp for a vehicle, the lamp comprising:

a plurality of light sources configured to emit light; and a lens disposed on a front side of the plurality of light sources, the lens comprising:

an input surface defining a rear side of the lens and configured to receive the light emitted from the plurality of light sources; and an output surface defining a front side of the lens and configured to emit the light received by the input surface, wherein the input surface includes:

a concave surface configured to receive the light from a first light source, among the plurality of light sources; and a convex surface configured to receive the light from a second light source, among the plurality of light sources, wherein the output surface comprises a plurality of bosses that form step surfaces, wherein the plurality of bosses comprise:

a first set of bosses configured to receive the light emitted through the concave surface and emit the light therethrough; and a second set of bosses configured to receive the light emitted through the convex surface and emit light therethrough, and wherein the light emitted through the concave surface provides a wide zone pattern, wherein the input surfaces include a plurality of concave surfaces and a plurality of convex surfaces, wherein the plurality of concave surfaces and the plurality of convex surfaces are alternately arranged along the first direction, wherein the first direction is defined as a direction being perpendicular to the upward/downward direction, and crossing the forward/rearward direction and a leftward/rightward direction, wherein the plurality of concave surfaces include a first concave surface, wherein the plurality of convex surfaces include a first convex surface and a second convex surface that are spaced apart from each other in the first direction, with the first concave surface being interposed therebetween, wherein the first convex surface is disposed on a front side of the second convex surface, and wherein the first convex surface is disposed between the first concave surface and the second convex surface with respect to the forward/rearward direction.

8. The lamp of claim 7, wherein the light emitted through the convex surface of the lens provides a hot zone pattern.

* * * * *